United States Patent [19]

Fujii et al.

[11] 4,450,490
[45] May 22, 1984

[54] SYSTEM FOR OBTAINING SYNCHRONIZED REPRODUCTION FROM A PLURALITY OF REPRODUCING APPARATUSES

[75] Inventors: Yasuhiko Fujii, Yamato; Mitsuru Kikuchi, Yokohama; Hiroyuki Saito, Tokyo, all of Japan

[73] Assignee: Victor Company of Japan, Ltd., Yokohama, Japan

[21] Appl. No.: 315,082

[22] Filed: Oct. 26, 1981

[30] Foreign Application Priority Data

Oct. 28, 1980 [JP] Japan ................. 55-151067

[51] Int. Cl.³ .................. G11B 27/02; G11B 15/46
[52] U.S. Cl. ............................. 360/13; 360/73
[58] Field of Search ........... 360/13, 14.1, 27, 26, 360/73

[56] References Cited

U.S. PATENT DOCUMENTS 4,249,218  2/1981  Davis et al. ............... 360/13
4,363,049  12/1982  Ohtsuki et al. ............ 360/13

*Primary Examiner*—Vincent P. Canney
*Attorney, Agent, or Firm*—Ladas & Parry

[57] ABSTRACT

A system for obtaining synchronized reproduction from a plurality of reproducing apparatuses by obtaining mutually synchronized reproduced signals from a plurality of reproducing apparatuses, where the plurality of reproducing apparatuses respectively reproduces recorded signals from a recording medium in which mutually identical address signals are recorded for each predetermined data signal block. The system for obtaining synchronized reproduction comprises a control circuit for controlling reproducing operations of the plurality of reproducing apparatuses so that one reproducing apparatus with respect to the other reproducing apparatus of the plurality of reproducing apparatuses performs reproduction in a state advanced by a predetermined quantity on the recording medium, a detection circuit for comparing and detecting a difference between address signals reproduced by the plurality of reproducing apparatuses, and a memory device controlled for writing-in and reading-out operations by a detection output from the detection means, for producing a reproduced signal from the one advanced reproducing apparatus after delaying the reproduced signal so as to be in synchronism with a reproduced signal from the other reproducing apparatus.

8 Claims, 9 Drawing Figures

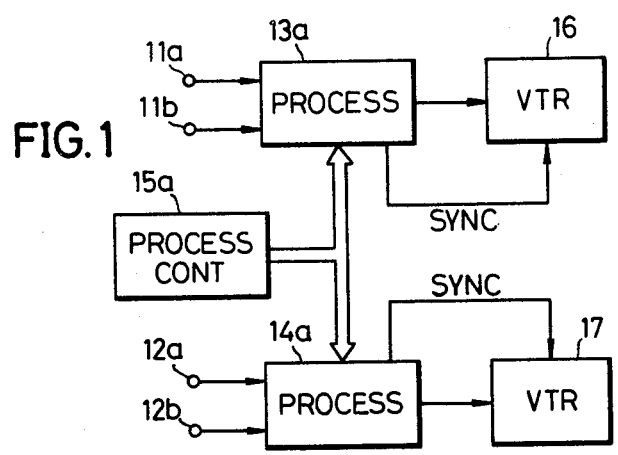
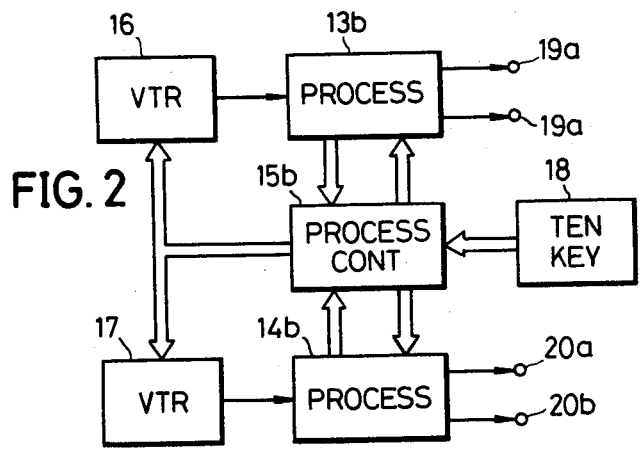
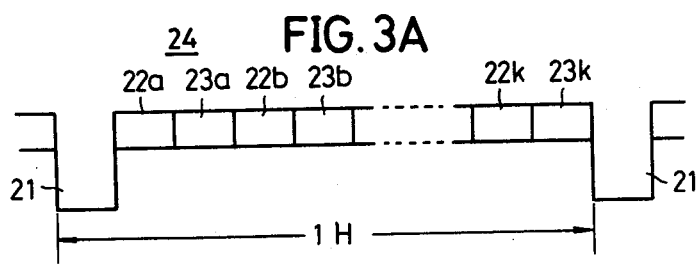
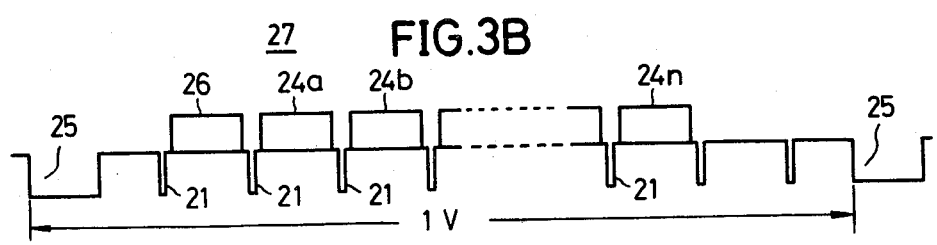

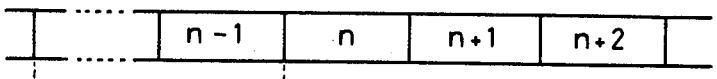
FIG. 4A
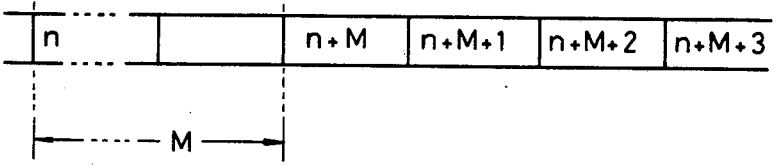
FIG. 4B
FIG. 5A
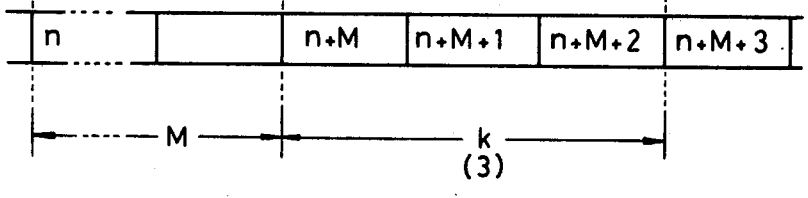
FIG. 5B
FIG. 6
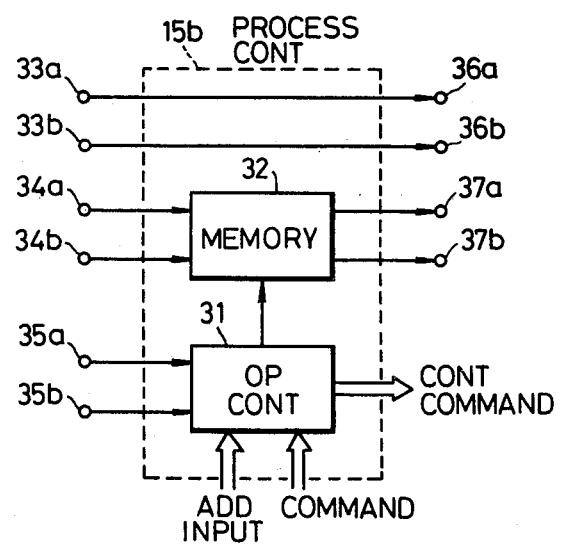

SYSTEM FOR OBTAINING SYNCHRONIZED REPRODUCTION FROM A PLURALITY OF REPRODUCING APPARATUSES

BACKGROUND OF THE INVENTION

The present invention generally relates to systems for obtaining synchronized reproduction from a plurality of reproducing apparatuses, and more particularly to a system for synchronously reproducing digital signals recorded together with address signals, by respectively obtaining synchronism with respect to a plurality of recording and reproducing apparatuses.

Conventionally, for example, a digital signal such as a pulse-code-modulated (PCM) audio signal has been recorded instead of a video signal, by use of a magnetic recording and reproducing apparatus (so-called VTR) which records and reproduces a video signal with respect to a magnetic tape by rotary heads. In this system, a two-channel signal, that is, the right-channel signal and the left-channel signal, are subjected to time-division multiplexing and recorded in each track.

When signals of three or more channels are to be recorded and reproduced, for example, in a case where signals of four-channels are to be recorded and reproduced, a method can be considered in which a plurality of, for example, two recording and reproducing apparatuses are synchronously operated to perform recording and reproduction in a state where the two apparatuses are mutually in synchronism.

Accordingly, the present inventors have devised and tested the following system. In this system, two recording and reproducing apparatuses are synchronously operated by use of a synchronizing signal. Several hundred words of digital data are designated by one block, and an address signal is added to each block. A first-channel signal and a second-channel signal are recorded on the magnetic tape by one recording and reproducing apparatus, and a third-channel signal and a fourth-channel signal are recorded on the magnetic tape by the other recording and reproducing apparatus, in a simultaneous manner. In a case where the VTR is of the helical scan system, the recording signal is successively recorded on a plurality of parallel tracks which are formed in an oblique manner with respect to the longitudinal direction of the magnetic tape. Each block of the recording signal is recorded in each track. Upon reproduction, the two recording and reproducng apparatuses are synchronously operated by use of the synchronizing signal. Moreover, the timing of the magnetic tape travel between both apparatuses is adjusted, so that the address signals of the reproduced signals obtained from the two apparatuses respectively coincide.

In order to adjust the timing of the magnetic tape travel between both apparatuses during the above reproduction, the tape travel of one recording and reproducing apparatus is temporarily stopped at the point in time when a specific address signal is reproduced, while the magnetic tape travel in the other recording and reproducing apparatus is not stopped until the same specific address signal as that above is reproduced. When the same specific address signal is reproduced in the above other recording and reproducing apparatus, the magnetic tape travel is temporarily stopped, and then, the magnetic tape travel in both recording and reproducing apparatuses are started simultaneously.

However, even when the address signal is detected as described above to stop the magnetic tape travel, the magnetic tape travel actually cannot be stopped immediately due to mechanical causes in the magnetic tape moving system. Accordingly, the magnetic tapes in both recording and reproducing apparatuses do not stop at completely identical positions, and shifts of over several tracks are introduced with respect to the corresponding tracks. Hence, even when the magnetic tape travel in both recording and reproducing apparatuses are started simultaneously, the blocks having the same address are not reproduced simultaneously, although the beginnings of the data blocks are reproduced together. Therefore, shifts of over several blocks in units of blocks are accordingly introduced, and a so-called synchronous error is introduced.

When the above kind of shift (error) exists, the reproduction fidelity becomes low and degradation is introduced in the sound quality.

Thus, a system can be considered in which the tape travel of one recording and reproducing apparatus is controlled while the tapes are travelling, after the tape travel in both recording and reproducing apparatuses are started simultaneously. The timing of the tape travel between both recording and reproducing apparatus can be adjusted so that the reproduced address signals from both apparatuses coincide, by the control operation performed with respect to the above one recording and reproducing apparatus. However, even when the tape travel is controlled after the tape travel is started to initiate reproduction, time is required until the addresses of both tapes perfectly coincide and the phases of the reproduced blocks perfectly coincide. Hence, there is a disadvantage in this system in that it is inevitable for degradation to be introduced in the sound quality of the reproduced sound. Therefore, the above system is not suited for practical use since a reproduced sound having a fine sound quality cannot be obtained immediately.

SUMMARY OF THE INVENTION

Accordingly, it is a general object of the present invention to provide a novel and useful system for obtaining synchronized reproduction from a plurality of reproducing apparatuses, in which the above described disadvantages have been overcome.

Another and more specific object of the present invention is to provide a system for obtaining synchronized reproduction which reproduces signals in synchronism with a relationship wherein the phases of the reproduced signals perfectly coincide, from a plurality of recording and reproducing apparatuses in which magnetic tapes respectively travel in a state with a relation where the phases respectively shift in units of data blocks.

Still another object of the present invention is to provide a system for obtaining synchronized reproduction which obtains synchronized reproduced signals from each of a plurality of reproducing apparatuses, by advancing the reproducing operation of one reproducing apparatus by a predetermined quantity with respect to another reproducing apparatus, to obtain the signal by delaying the signal by a delay quantity including the above predetermined quantity and a shift quantity between both reproducing apparatuses.

Other objects and further features of the present invention will be apparent from the following detailed description when read in conjunction with the accompanying drawings.

BRIEF DESCRIPTION OF THE DRAWINGS

FIG. 1 is a systematic block diagram showing an example of a recording system for recording a signal which is to be reproduced by a system according to the present invention;

FIG. 2 is a systematic block diagram showing an embodiment of a reproducing system having a system for obtaining synchronized reproduction according to the present invention;

FIGS. 3A and 3B respectively are diagrams for explaining signals in units of one horizontal scanning period and in units of one vertical scanning period of the digital signal which is recorded by the recording system shown in FIG. 1;

FIGS. 4A and 4B respectively are diagrams showing a signal in units of blocks, for explaining the setting of shift in the tape reproducing position in two recording and reproducing apparatuses;

FIGS. 5A and 5B respectively are diagrams showing a signal in units of blocks, for explaining the actual shift in the tape reproducing position in the two recording and reproducing apparatuses; and FIG. 6 is a systematic block diagram showing a first embodiment of a system for obtaining synchronized reproduction according to the present invention.

DETAILED DESCRIPTION

First, description will be given with respect to an example of a recording system for recording a signal which is to be reproduced by the system according to the present invention, by referring to FIG. 1. First-channel and second-channel audio signals from input terminals 11a and 11b, and third-channel and fourth-channel audio signals from input terminals 12a and 12b, are respectively supplied to recording system signal processing circuits (processors) 13a and 14a. These audio signals thus supplied to the processors 13a and 14a, are respectively subjected to predetermined signal processing operations. In the above processor 13a, the first-channel and second-channel audio signals are converted into pulse-code-modulated (PCM) digital signals. As indicated in FIG. 3A, first-channel digital signals 22a, 22b, ---, 22k and second-channel digital signals 23a, 23b, ---, 23k alternately exist between synchronizing signals 21 occurring for every interval of one horizontal scanning period (1H) which is the same as that of a horizontal synchronizing signal in a video signal. A signal 24 has the above first-channel digital signals 22a through 22k and the second-channel digital signals 23a through 23k as a unit. As indicated in FIG. 3B, for example, signals 24a, 24b, ---, 24n exist throughout a range of 245H, between synchronizing signals 25 occurring for every interval of one vertical synchronizing period (1V) which is the same as that of a vertical synchronizing signal in the video signal. Moreover, an address signal 26 exists at the beginning part of the above 1V interval. A signal 27 having the above interval of 1V as a unit, will hereinafter be referred to as a signal of one "block". This one-block signal 27 has 735 words of data, for example, by designating sixteen bits as one word. The third-channel and fourth-channel signals also undergo similar signal processing operations at the processor 14a.

The processors 13a and 14a are supplied with a clock signal from a recording system processor control circuit 15a, and operate in mutually synchronized states. Furthermore, these processors 13a and 14a are supplied with an address signal having binary-coded-data (BCD) of six digits, and the same address signal 26 is inserted into the beginning part of each block signal 27. Accordingly, both signals obtained from the processors 13a and 14a respectively have the same address signal for each block.

The block signals from the above processors 13a and 14a are supplied to magnetic recording and reproducing apparatuses, that is, for example, to helical scanning rotary head type VTRs 16 and 17. Thus, the block signals are respectively recorded in terms of one block signal per track, in a track which is formed in an oblique manner with respect to the longitudinal direction of the magnetic tape. The operations of the VTRs 16 and 17 are controlled by the synchronizing signals obtained from the processors 13a and 14a.

Next, description will be given with respect to a reproducing system for synchronously reproducing the signals thus recorded by the above VTRs 16 and 17, by referring to FIGS. 2 and 6. First, an address from which reproduction is to be started, is specified by manipulating a ten-key 18. A reproducing system processor control circuit 15b has a construction shown in FIG. 6, and has an operation/control circuit 31 which is supplied with the above specified address signal. In addition, the operation/control circuit 31 receives a search-reproducing operation starting command, and produces and supplies a control command to the VTRs 16 and 17. Hence, the VTRs 16 and 17 respectively start a search-operation, and the reproduced signals from these VTRs 16 and 17 are respectively supplied to reproducing system processors 13b and 14b shown in FIG. 2.

The address signal and the reproduced data signal are respectively separated at the above processors 13b and 14b, and the separated address signals are supplied to the operation/control circuit 31 through terminals 35a and 35b. The operation/control circuit 31 compares the specified address with reproduced addresses obtained from the VTRs 16 and 17 through the terminals 35a and 35b. In a case where the address from the terminal 35a coincides with the specified address, the operation/control circuit 31 produces a stop command, to temporarily stop the VTR 16 and put the VTR 16 in a waiting state. On the other hand, when the address from the terminal 35b coincides with the specified address, the above operation/control circuit 31 puts the VTR 17 into a temporarily stopped state, that is, a waiting state.

Even when the addresses are detected as described above and the VTRs 16 and 17 are stopped to afterwards start a reproducing operation in a simultaneous manner, a shift or difference of k (k is an integer) blocks is inevitably introduced in the reproduced signals from both VTRs, due to mechanical inconsistency in the tape moving and stopping system in each VTR, and the like. However, the value of k in this difference of k blocks has a certain upper limit according to the accuracy of the VTR, and does not assume an arbitrary value.

Accordingly, in the present invention, a value of M (M is an integer) satisfying the relation $|k| < M$ is set. Moreover, main and sub apparatuses are established, for example, by setting the VTR 16 as the main apparatus and the VTR 17 as the sub apparatus. The VTR 17 which is the sub apparatus starts to perform reproduction before the VTR 16 which is the main apparatus, by a time corresponding to M blocks.

Therefore, after the VTRs 16 and 17 perform the search-operation with respect to the reproduction starting address and are temporality stopped to be put into the waiting states as described above, the VTRs 16 and 17 start to perform reproducing operations so that the VTR 17 performs reproduction by a time corresponding to M blocks before the VTR 16. Hence, in an ideal state, the reproduced signals from the VTRs 16 and 17 becomes as indicated in FIGS. 4A and 4B. As indicated in these FIGS. 4A and 4B, the reproduced signal from the VTR 17 is advanced by a time corresponding to the M blocks as compared to the reproduced signal from the VTR 16. When the VTR 16 reproduces the n-th block, for example, the VTR 17 reproduces the (n+M)-th block.

However, in reality, a shift of k blocks is introduced even when the two VTRs simultaneously start reproducing operations. Accordingly, in reality, for example, when the VTR 16 reproduces the n-th block, the VTR 17 reproduces the (n+M+3)-th block as indicated in FIGS. 5A and 5B, in a case where it is assumed that K=3 for the purpose of simplifying the description.

A memory 32 of the processor control circuit 15b shown in FIG. 6 has a memory capacity for 2M blocks.

When reproduction is started, the reproduced signals from the VTRs 16 and 17 are respectively supplied to the processors 13b and 14b. The data signal from the processor 13b passes through terminals 33a and 33a and the processor control circuit 15b as it is, and is again supplied to the processor 13b. In addition, the address signal from the processor 13b is supplied to the control circuit 31 through the terminal 35a. On the other hand, the data signal from the processor 14b is supplied to the memory 32 terminals 34a and 34b, and the address signal of the processor 14b is supplied to the operation/control circuit 31 through the terminal 35b.

The operation/control circuit 31 detects the difference (periodic error) between the two address signals respectively obtained from the terminals 35a and 35b. That is, in the above example, the operation/control circuit 31 detects the value of (M+k), and controls the operation of the memory 32 according to this value.

The memory 32 has two indexes for respectively specifying the write-in address and the read-out address. For example, when the memory is divided into 2M blocks and each block is designated by an address from zero to (2M−1), the write-in operation is performed by successively writing-in from the first block (zero address) to the 2M−th block (address of (2M−1)) and then repeating an operation in which the write-in operation is performed from the first block to the 2M−th block. The address of each block is specified by the index for write-in operation. On the other hand, the read-out operation is performed at the same speed as the above write-in operation is performed, by performing similar operations. The addresses are similarly specified by the index for read-out operation.

The output reproduced signal from the VTR 17 is thus written (stored) into the memory 32 by the above described operations. In a case where the address specified by the index for read-out operation is zero, the value (M+k) of the synchronous error obtained from the operation/control circuit 31 is used to set the address specified by the index for write-in operation to an address of (M+k). Hence, the memory 32 writes-in the (M+k+1)−th block (address of (M+k)) and reads-out the first block (zero address) in a simultaneous manner. Next, the memory 32 performs an operation in which the (M+k+2)−th block is written-in and the second block is read-out in a simultaneous manner. By these operations performed by the memory 32, the output reproduced signal from the VTR 17 is delayed by (M+k) blocks. Accordingly, the synchronous error of the VTR 17 in which the reproduced signal of the VTR 17 was advanced by (M+k) blocks with respect to the VTR 16, is thus eliminated.

Therefore, with respect to the reproduced data signals of the VTR 16 obtained through terminals 36a and 36b, reproduced data signals of the VTR 17 which are not advanced or delayed and are in synchronism with the reproduced data signals of the VTR 16 are obtained through terminals 37a and 37b.

The digital signals from the terminals 36a and 36b and the terminals 37a and 37b, are respectively supplied to the processors 13b and 14b. These digital signal thus supplied to the processors 13b and 14b are subjected to predetermined signal processing operations, and converted into analog signals. Therefore, the first-channel and second-channel signals and the third-channel and fourth-channel signals which are in synchronism, are respectively obtained from terminals 19a and 19b and terminals 20a and 20b.

In the present embodiment of the invention, a practically satisfactory result is obtained by constructing the memory 32 from four 64K-dynamic random-access-memories (RAMs) to set the memory capacity to 2M and provide a capacity for approximately ten blocks. Hence, in this case, the quantity (M) with which the VTR 17 is advanced with respect to the VTR 16 is five blocks. Moreover, in reality, the difference quantity k between the VTRs 16 and 17 is in the order of ±3 blocks.

In FIGS. 1 and 2, the recording system processors 13a and 14a and the reproducing system processors 13b and 14b indicated by separate blocks. However, these processors 13a, 14a, 13b, and 14b can be constructed by one processor. Furthermore, the processor control circuits 15a and 15b in the recording and reproducing systems, may be constructed from one processor control circuit. In addition, description was given above with respect to the drawings for the case where k>0, however, the operations are identical for the case where k>0.

In a case where recording and reproduction are to be performed by use of three or more VTRs, additional processors and processor control circuits may be provided according to the number of VTRs.

Moreover, the first-channel through fourth-channel signals are not limited to audio signals as in the above embodiment of the invention. For example, the first-channel through third-channel signals may be audio signals, while the fourth-channel signal is a still picture video signal.

Further, the present invention is not limited to these embodiments, but various variations and modifications may be made without departing from the scope of the present invention.

What is claimed is:

1. A system for obtaining synchronized reproduction from a plurality of reproducing apparatuses by obtaining mutually synchronized reproduced signals from a plurality of reproducing apparatuses, each of said plurality of reproducing apparatuses reproducing recorded signals from a recording medium, each recording medium being pre-recorded with mutually identical address signals for each predetermined data signal block, said system for obtaining synchronized reproduction comprising:

stopping means for temporarily and individually stopping reproducing operations of said plurality of reproducing apparatuses when a reproduced address coincides with a preset address in each of said plurality of reproducing apparatuses, and for resuming the reproducing operations of said plurality of reproducing apparatuses so that the address is substantially matched with respect to each recording medium;

control means for controlling reproducing operations of said plurality of reproducing apparatuses so that one reproducing apparatus with respect to another reproducing apparatus among said plurality of reproducing apparatuses performs reproduction in a state advanced by a predetermined quantity on the recording medium;

detection means for comparing and detecting a difference between address signals reproduced by said plurality of reproducing apparatuses; and memory means controlled for writing-in and reading-out operations by a detection output received from said detection means, for producing a reproduced signal from said one advanced reproducing apparatus after delaying the reproduced signal, so that the delayed reproduced signal from said one advanced reproducing apparatus is in synchronism with a reproduced signal received from said other reproducing apparatus.

2. A system for obtaining synchronized reproduction as claimed in claim 1 in which said predetermined quantity for advancing reproduction is M blocks (M is an integer), the value of M being selected so as to satisfy a relation $M > |k|$ where k indicates a reproducing error component between reproducing apparatuses, and said memory means has a memory capacity of 2M blocks.

3. A system for obtaining synchronized reproduction as claimed in claim 2 in which said k indicates a reproduction error related to a difference component between reproducing apparatuses when reproduction is started in said state where the address is substantially matched.

4. A system for obtaining synchronized reproduction as claimed in claim 1 in which each of said reproducing apparatuses includes a recording system for recording a recording signal together with said identical address signals onto said recording medium by being operated in synchronous manner.

5. A system for obtaining synchronized reproduction as claimed in claim 1 in which said recording medium is a magnetic tape, said magnetic tape being recorded with the signals on parallel tracks formed in an oblique manner with respect to the longitudinal direction of the tape, and each reproducing apparatus reproduces the recorded signals from oblique tracks on said magnetic tape by use of rotary heads.

6. A system for obtaining synchronized reproduction as claimed in claim 5 in which said data signal block exists for every synchronizing signal interval corresponding to a vertical synchronizing signal in a video signal, said address signals exist at a beginning position between said synchronizing signals, and said data signal block in each synchronizing signal interval and said address signals are recorded for each of said tracks.

7. A system for obtaining synchronized reproduction as claimed in claim 2 in which said value for M is selected to a value in the order of 10.

8. A system for obtaining synchronized reproduction from a plurality of reproducing apparatuses by obtaining mutually synchronized reproduced signals from a plurality of reproducing apparatuses, said plurality of reproducing apparatuses respectively reproducing recorded signals from a recording medium in which mutually identical address signals are recorded for each predetermined data signal block, said system for obtaining synchronized reproduction comprising:

means for respectively and temporarily stopping said reproducing apparatuses when an address equal to a preset address is reproduced, to start reproduction in a state where each recording medium is substantially matched at the same address;

control means for controlling reproducing operations of said plurality of reproducing apparatuses so that one reproducing apparatus with respect to another reproducing apparatus of said plurality of reproducing apparatuses performs reproduction in a state advanced by a predetermined quantity on the recording medium;

detection means for comparing and detecting a difference between address signals reproduced by said plurality of reproducing apparatuses; and memory means controlled for writing-in and reading-out operations by a detection output received from said detection means, for producing a reproduced signal from said one advanced reproducing apparatus after delaying the reproduced signal so that the delayed reproduced signal from said one advanced reproducing apparatus is in synchronism with a reproduced signal received from said other reproducing apparatus, said predetermined quantity for advancing reproduction being M blocks (M is an integer), the value of M being selected so as to satisfy a relation $M > |k|$ where k indicates a reproducing error component between reproducing apparatuses, said memory means having a memory capacity of 2M blocks, said k indicating a reproduction error on a difference component between reproducing apparatuses when reproduction is started at said substantially matched state.

* * * * *